United States Patent
Zhao et al.

(10) Patent No.: US 7,370,525 B1
(45) Date of Patent: May 13, 2008

(54) INFLIGHT ICE DETECTION SYSTEM

(75) Inventors: Dong Zhao, Sydney (AU); Paul Cameron Andel, Sydney (AU); Brian McGuire, Sydney (AU)

(73) Assignee: Swan International Sensors Pty. Ltd., Sydney, NSW (AU)

( * ) Notice: Subject to any disclaimer, the term of this patent is extended or adjusted under 35 U.S.C. 154(b) by 11 days.

(21) Appl. No.: 11/555,266

(22) Filed: Oct. 31, 2006

(51) Int. Cl.
*G01W 1/00* (2006.01)

(52) U.S. Cl. .............................. 73/170.17; 73/170.21; 73/170.26

(58) Field of Classification Search . 73/170.16–170.26
See application file for complete search history.

(56) References Cited

U.S. PATENT DOCUMENTS

| | | | |
|---|---|---|---|
| 2,359,878 | A | 10/1944 | Peters et al. |
| 3,996,787 | A | 12/1976 | Edginton |
| 4,461,178 | A | 7/1984 | Chamuel |
| 4,553,137 | A | 11/1985 | Marxer et al. |
| 4,570,881 | A | 2/1986 | Lustenberger |
| 4,725,145 | A | 2/1988 | Azzam |
| 4,745,804 | A | 5/1988 | Goldberg et al. |
| 4,782,331 | A * | 11/1988 | Martens ............ 340/583 |
| 4,797,660 | A * | 1/1989 | Rein, Jr. ............ 340/583 |
| 4,803,470 | A | 2/1989 | Fineman |
| 5,003,295 | A | 3/1990 | Kleven |
| 4,980,673 | A | 12/1990 | Kleven |
| 5,014,042 | A | 5/1991 | Michoud |
| 5,170,049 | A | 12/1992 | De Jonge et al. |
| 5,180,122 | A | 1/1993 | Christian et al. |
| 5,206,806 | A | 4/1993 | Gerardi et al. |
| 5,243,185 | A | 9/1993 | Blackwood |
| 5,296,853 | A * | 3/1994 | Federow et al. ............ 340/962 |
| 5,475,370 | A | 12/1995 | Stern |
| 5,551,288 | A | 9/1996 | Gerardi et al. |
| 5,596,320 | A | 1/1997 | Barnes |
| 5,617,076 | A | 4/1997 | Stern et al. |
| 5,748,091 | A | 5/1998 | Kim |
| 5,760,711 | A | 6/1998 | Burns |
| 5,823,474 | A | 10/1998 | Nunally |
| 5,841,538 | A | 11/1998 | Schoeffler et al. |
| 5,850,284 | A | 12/1998 | Schoeffler |
| 5,929,443 | A * | 7/1999 | Alfano et al. ............ 250/341.3 |
| 6,010,095 | A | 1/2000 | Hackmeister |
| 6,052,056 | A | 4/2000 | Burns et al. |
| 6,069,565 | A | 5/2000 | Stern et al. |
| 6,091,335 | A | 7/2000 | Breda et al. |

(Continued)

FOREIGN PATENT DOCUMENTS

GB      EP 1633626      12/2004

OTHER PUBLICATIONS

Kenneth Sassen, "The Polarization Lidar Technique for Cloud Research: A Review and Current Assessment"; Bulletin American Meteorological Society, Dec. 1991, pp. 1848-1866, vol. 72, No. 12, published American Meteorological Society.

*Primary Examiner*—Edward Lefkowitz
*Assistant Examiner*—Jermaine Jenkins

(57) ABSTRACT

A dual channel inflight ice detection system to detect ice accretion on an aircraft surface by illuminating an ice collecting surface mounted on an aircraft with linear polarized light. The backscattered light is acquired in two light conductors one with polarization sensitivity aligned to the transmitted light and the second with polarization sensitivity orthogonal to the first. The presence of ice is determined by the change in the ratio of light intensities in the two light conductors.

20 Claims, 7 Drawing Sheets

U.S. PATENT DOCUMENTS

| | | |
|---|---|---|
| 6,320,511 B1 | 11/2001 | Cronin et al. |
| 6,425,286 B1 * | 7/2002 | Anderson et al. ........ 73/170.26 |
| 6,430,996 B1 | 8/2002 | Anderson et al. |
| 6,762,409 B2 * | 7/2004 | Fritsch et al. .......... 250/339.07 |
| 6,776,037 B2 | 8/2004 | Maatuk |
| 6,819,265 B2 | 11/2004 | Jamieson et al. |
| 7,000,871 B2 | 2/2006 | Barre et al. |
| 7,014,357 B2 | 3/2006 | Severson |
| 7,104,502 B2 | 9/2006 | Otto et al. |
| 7,312,713 B2 * | 12/2007 | Alfano et al. ................ 340/583 |
| 2002/0158768 A1 | 10/2002 | Severson |
| 2007/0046478 A1 * | 3/2007 | Crisman ..................... 340/580 |

* cited by examiner

INFLIGHT ICE DETECTION SYSTEM

FIELD OF THE INVENTION

The present invention relates to inflight detection of ice accretion on the surface of an aircraft.

BACKGROUND OF THE INVENTION

Accretion of ice on the surface of aircraft is a problem experienced by flight operations. Such ice accretion may dramatically impact the performance characteristics of the aircraft and has been known as the root cause of a number of major accidents in recent times.

Accretion of ice may occur when the aircraft is flying through supercooled liquid such as cloud, rain or drizzle and at a time when the temperature of the surface of the aircraft is below freezing point. The severity of the ice accretion is dependent on the supercooled water content, the temperature and the size of the cloud droplets or raindrops. Ice accretion on an aircraft surface increases drag, alters aircraft handling characteristics, disrupts the airflow, reduces lift and may result in a stall condition.

Some large Transport and Regional Aircraft are currently equipped with an inflight ice detection system to warn of ice accretion on the surface of the aircraft. Typically such systems are based on magnetostriction principles to drive a sensing probe at an ultrasonic frequency. As the probe accretes ice the probe frequency decreases due to the increased mass. This change in frequency initiates the icing signal. Such systems are expensive, consume considerable power and occupy significant space in the aircraft.

Within Business and General Aviation Aircraft operations the practise of direct pilot observation of ice after it has accumulated on the aircraft wing is commonly found. The pilot incurs a substantial distraction when required to make such observations. Such an observation and related distraction may occur at a critical phase of the flight.

At the present time there are no known, reliable, un-attended and cost-effective inflight ice detection systems available for the complete range of aircraft from Transport Category to General Aviation type aircraft.

This invention introduces an improved inflight ice detection system, of lower cost and simpler construction, capable of being utilised, un-attended, on the complete range of aircraft in operation today. Additionally this invention provides an improved positive discrimination between ice and other substances such as water or de-icing fluid that may be found on the surface of the aircraft whilst inflight.

Recent advances in Inflight Integrated Detection Systems such as that disclosed in U.S. Pat. No. 6,430,996 act to detect, inflight, a number of different parameters including the presence of ice using multi function sensor probe. Such equipment detects ice when a light beam, directed across a recessed surface within the probe, is broken. While such a system provides additional information the function of inflight icing detection does not provide a reliable detection of ice on the surface of aircraft because ice formation on the recessed surface of the probe lags ice formation on prominent aircraft surfaces. Neither does the method provide an effective discrimination between water and ice.

Recent advances, such as those disclosed in European Patent No. EP1633626, International Publication Number WO 2004/110865 A1, act to detect ice on the surface of an aircraft by use of a single emitter connected to the surface and a six piece sensor array, connected to the surface by optical fibres at different distances on the surface with respect to the emitter. A complex means of detecting the distribution of the reflected and scattered light across the six sensors determines the presence, type and thickness of ice on the surface. Such a system requires significant set-up and is prone to changes from calibrated conditions. Additionally such a system does not discriminate between water and clear ice. Such a system is impractical for use inflight on the complete range of aircraft.

Recent advances in Inflight Detection of Icing Conditions such as that disclosed in U.S. Pat. No. 6,091,335 act to detect, inflight, in an external volume from the aircraft, likely icing conditions. Such equipment detects possible icing conditions as indicated by the concentration of water and ice particles in the external illuminated volume. The icing severity is determined by the temperature and the water concentration multiplied by speed of aircraft. Such a system utilises separate transmit and receive optics known in the art as bi-static telescope arrangements. Those experienced in the art favour the use of mono-static telescope arrangement due to difficulties in maintaining critical alignment between transmit and receive optics. While such a system may provide information on the risk of icing conditions in volumes external to the aircraft it does not provide a reliable measure for detection of inflight ice accretion on the surface of an aircraft.

Advances in Inflight Ice Detection Systems such as that disclosed in U.S. Pat. No. 6,052,056 act to detect and warn the pilot of the presence of substances on the surface of the aircraft. Such equipment detects changes from a standard pattern and infers the presence of ice by a variation in the amount of light returned from the monitored surface. While such a system, containing a single light detector is compact it cannot discriminate contamination from ice.

Advances, such as those disclosed in U.S. Pat. No. 6,010,095 act to detect ice by means of total internal reflection of a light beam. As the refractive index of water and ice are very similar this and other advances using refraction techniques does not have the ability to effectively discriminate between ice and water. The use inflight of such equipment for detection of ice on aircraft surfaces is not appropriate.

Advances, such as those disclosed in U.S. Pat. No. 6,069,565 act to detect ice on the metallic painted surface of an aircraft by transmitting light from a strobed source to the surface of the aircraft and then splitting the reflected light into an isolated portion and a non-isolated portion. A complex means of delaying one portion relative to the other and comparing the received signal of the two portions is used to determine the presence of ice. Such equipment may be used by an operator to detect presence of ice on an aircraft surface prior to flight. Unfortunately, such equipment cannot be used in an un-attended fashion inflight.

Other advances, such as those disclosed in U.S. Pat. No. 5,850,284 act to detect ice on the surface of an aircraft by placing a polarization filter on the surface of the aircraft and then detecting the reflections of ambient light on that surface. Significant manipulation by the equipment operator is required in order to detect ice on an aircraft surface prior to flight. Unfortunately, such equipment is unable to detect inflight icing conditions in an un-attended fashion.

Other advances, such as those disclosed in U.S. Pat. No. 5,841,538 act to detect ice on the surface of an aircraft by placing a retroreflector on the aircraft surface and then placing a polarizing filter on the retroreflector. The reflections of light are viewed when passed through a second filter placed in the reflection path. Significant equipment manipulation is required to detect the presence of ice on the surface of the aircraft prior to flight. Unfortunately, such equipment is impractical for detection of inflight icing conditions in an un-attended fashion.

Advances, such as those disclosed in U.S. Pat. No. 4,980,673 and related U.S. Pat. No. 5,003,295 act to detect ice deposition utilising thermal sensing and related thermal control systems. While such equipment may be used inflight it's use is not accurate as in flight ice deposition can occur over a very wide range of temperature and flight conditions.

Advances, such as those disclosed in U.S. Pat. No. 5,243,185 act to detect ice by transmitting linear-polarized light to a target surface, filtering the single channel reflections with an elliptically-polarized filter and then detecting the filtered reflections via a number of sensor elements. Each of the sensor elements detects the reflected response from different spatial locations. The variance among the different sensor signals is processed as an indication of the variation in filtered reflections across the target. Unfortunately, in view of the randomness of ice crystal orientations, a variance will not be detected unless the sensors are set to detect at individual crystal level. Such a system requires many sets of acquisitions, using additional filtering, over the same target area in order to give adequate accuracy of detection. Such a system, requiring significant processing, may be usable to test for presence of ice prior to flight. Such a system however is impracticable for use inflight on the complete range of aircraft.

SUMMARY OF THE INVENTION

It is an object of the present invention to provide an improved system for inflight detection of ice on the surface of an aircraft. The characteristics of such a system include simplicity, reliability, accuracy, sensitivity and effective discrimination between liquid and solid phases of water.

A well established body of knowledge ref. Sassen, Bulletin American Meteorological Society 1991 exists in the use of the optical anisotropic properties of ice crystal and the use of this property as a discriminator of liquid versus solid phases of water. According to the Mie theory, droplets such as water backscatter through a combination of axial and paraxial reflections which do not change the polarization state. According to ray-tracing theory backscatter from ice crystals, not oriented in the same direction, normally emerges after internal reflections that rotate the incident polarization plane leading to depolarization.

Many crystals are solids in which the atoms or molecules making up the solid are arranged in an orderly fashion. The orientation of the beam of light or of its plane of polarization does not matter for such a crystal. Such a material is said to be optically isotropic, meaning that, as far as incident light is concerned, the material behaves the same in all directions.

Ice crystals are not physically the same in all directions and hence the anisotropy. The anisotropy of the ice crystal is a result of different binding forces between different atoms or groups of atoms within the solid which are oriented in different directions. Different binding forces between the electrons within the solid and the various atoms means that the material will respond differently to the force imposed on the electrons by the electric field of the incident electromagnetic wave if it is polarized one way versus another way.

In accordance with a first aspect of the present invention, there is provided a dual channel method of inflight detection of ice on the surface of an aircraft, the method comprising (a) Illuminating an ice collecting surface fixed in a housing mounted on an aircraft with a light source of single linear polarization (b) Acquiring backscattered light from said ice collecting surface using a pair of polarization sensitive light conductors when the polarization sensitivity of the first receiving light conductor is aligned to the polarization of the light source and the polarization sensitivity of the second receiving light conductor is aligned orthogonal to the polarization of the light source (c) Coupling each receiving light conductor to a light detector to determine the backscattered light intensity for each polarization state (d) Processing the detected light intensities in each light detector to determine ratio between the light intensity for each polarization state (e) Processing the change in said ratio to indicate ice accretion on the ice collecting surface (f) Activating a heat source adjacent to said housing upon indication of ice accretion (g) Continued operating of heat source until a change in detected light intensities indicates the removal of ice on the ice collecting surface (h) Monitoring the detected light intensities in each light detector and processing the change in detected light intensities until re-accretion of ice is detected on the ice collecting surface (i) Processing time for re-accretion of ice to indicate the ice accretion severity.

The method is continuously repeated while the aircraft is inflight.

In the preferred embodiment the housing containing the related ice collecting surface is inserted to the tip of a heated sensor tube. The sensor tube, exposed to the airflow, may alternately be mounted to the fore of the aircraft or mounted via a strut under the wing. Such sensor tube are commonly used in the industry for alternate air sensing applications and are commonly known to be components on which the accretion of ice first occurs on the aircraft.

In an alternate embodiment the housing containing the related ice collecting surface, with an adjacent heating source is mounted in the rear portion of the wing surface. At such locations ice accretion on the rear portion of the wing will be detected. Accretion of ice in locations at the rear portion of the wing is known to be particularly dangerous for flight operations.

The present invention provides a substantial advantage over prior art and the current visual observation techniques as practiced in the industry. This system is highly sensitive in automated detection of low levels of ice accretion and provides a very effective discrimination between water and ice. The system reduces pilot work load while providing timely and accurate detection of ice during what may be a critical phase in the flight. The components of the system exposed to the external environment are passive. The present invention is simple, low cost and reliable in nature.

BRIEF DESCRIPTION OF THE DRAWINGS

Preferred and other embodiments of the present invention will now be described with reference to the accompanying drawings in which.

DETAILED DESCRIPTION OF THE PREFERRED AND OTHER EMBODIMENTS

The current invention detects ice accretion on aircraft surfaces by polarization discrimination technique.

The preferred embodiment and other exemplary embodiments are described below.

Figure 1:
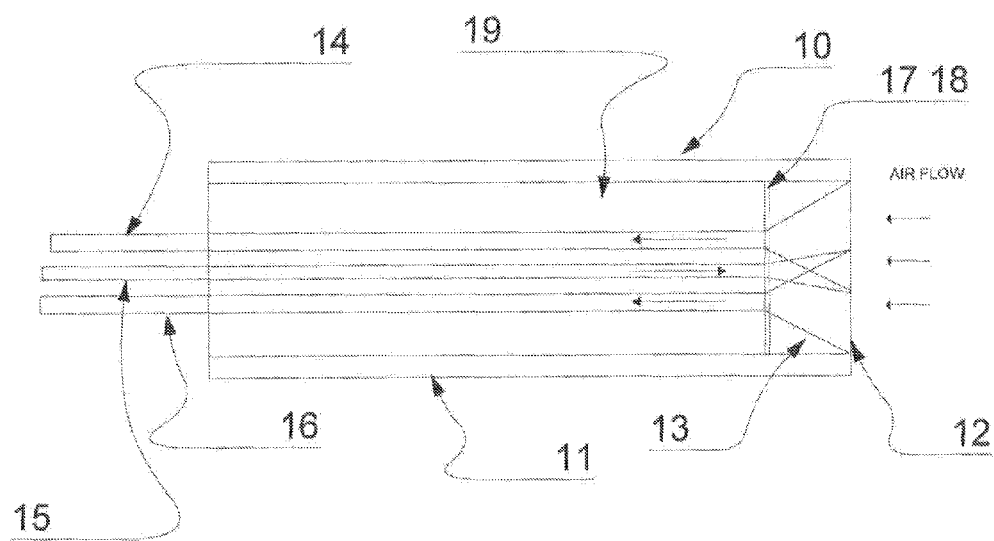
FIG. 1 depicts the sensing head of the dual channel ice detection system containing the ice collecting surface, the light conductors, the polarizing filters and the housing in the preferred embodiment.
Figure 2A:
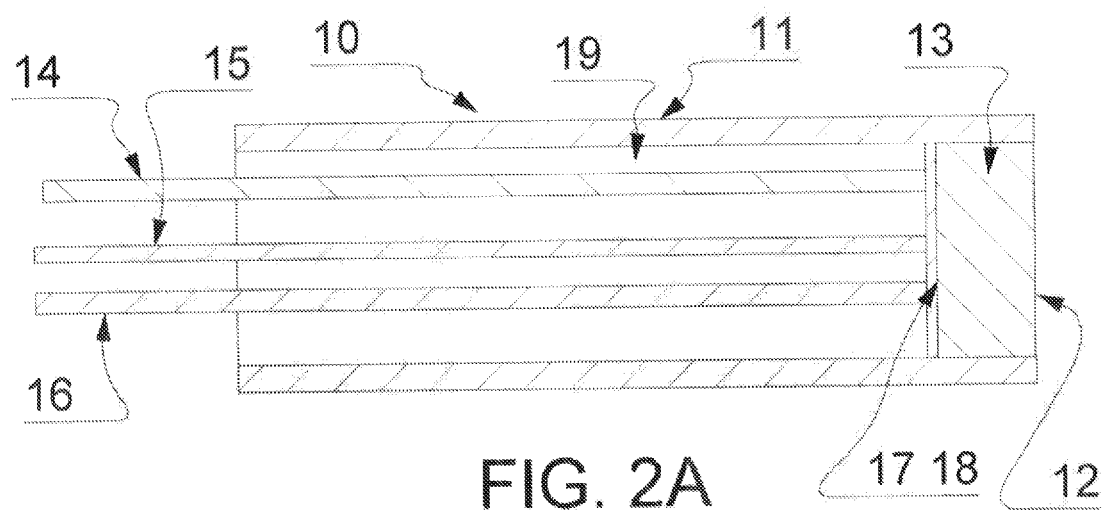
FIGS. 2A, 2B, 2C and 2D further depict details of the sensing head including alternate arrangements for the polarizing filters in the preferred embodiment.

Turning initially to FIG. 1 and FIG. 2A, there is provided means for illuminating an ice collection surface 12 fixed in a housing 11 mounted on an aircraft with linearly polarized light. The illuminating light is carried by a light conductor 15 from a remote light source, and polarized through a polarising filter 17 placed between the end of the light conductor 15 and the window 13 whose outer surface is the ice collection surface 12. There is also provided means for collecting the reflected and scattered light through two larger light conductors 14 and 16 as dual receiving channels. The light conductor 14 collects light of the same polarization state as that of the illuminating light because the collected light passes through the same polarizing filter 17. The light conductor 16 collects light of the orthogonal polarization state to that of the illuminating light because the collected light passes through a polarizing filter 18 which is oriented orthogonal to polarizing filter 17. The three light conductors 14, 15 and 16 are held inside a glass ferrule 19, which, together with the polarizing filters 17, 18, and the window 13, are all mounted inside the housing 11 to form the sensing head 10. The polarizing filters are preferably of the film type, and are permanently attached to the ferrule and the window with cured optical epoxy.

Figure 2B:
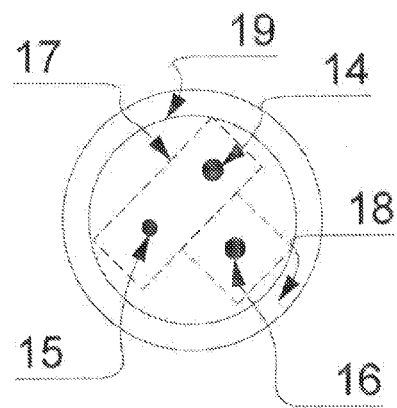
Figure 2C:
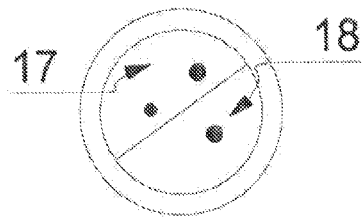
Figure 2D:
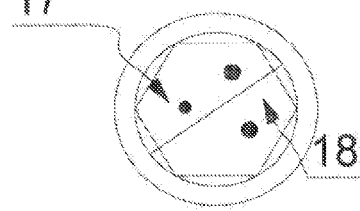

FIGS. 2B-2D show examples of the geometries the polarizing filters 17 and 18 can take. It is important to note that the shapes of the filters can vary as long as their polarization alignment with respect to each other is orthogonal, and that polarizing filter 17 covers the ends of light conductors 15 and 14, and that polarizing filter 18 covers the end of light conductor 16.

It is provided in the preferred embodiment, a HI 980 single mode optical fibre as light conductor 15, and multi-mode optical fibres of 600 μm core size and 0.39 numerical aperture as light conductors 14 and 16. Other fibre sizes and type can also be used.

The remote light source can be, but not limited to, Laser Diode, Amplified Spontaneous Emission Light Source, Light Emitting Diode and Super-Luminescence Light Emitting Diode.

In accordance with the preferred embodiment, the linear polarization state of the illuminating light is established using a polarizing filter. In this scenario, if a polarized light source is used, its polarization state will first be scrambled such that light enter the light conductor 15 is un-polarized.

An alternate way of achieving the desired polarization arrangement among the three light conductors without depolarization when using a linearly polarized light source is to use a polarization maintaining optical fibre as the light conductor 15, and to align the axis of the polarization maintaining optical fibre to the polarization orientation of the source and the polarizing filter 17 simultaneously.

In accordance with the preferred embodiment, Light output from the light conductor 15 passes through the polarizing filter 17 and the window 13 to illuminate an area on the surface 12. The size of the illuminated area depends on the core size and numerical aperture of the light conductor 15, wavelength of the light, and refractive indices and thickness of the polarizing filter 17 and the window 13. The same categorical characteristics also determine the size of receiving areas on the surface for the two receiving conductors 14 and 16. The design is such that the illuminated area falls within both the receiving areas.

The window is made of optically transparent and isotropic material, eg. glass. When its surface 12 is free of ice or water, part of the illuminating light is reflected by the glass-air interface at surface 12, and received by light conductors 14 and 16. Because of the optical isotropy of the window material, the reflection of light preserves its original polarization state, therefore light conductor 14, having the same polarization orientation, picks up the reflected light, while the light conductor 16 receives little in its polarization state which is orthogonal to that of the source and the reflected light. So the light intensity is high in the conductor 14, lower in conductor 16, and the ratio of light intensity in conductor 14 over 16 is very high.

When there is water on the surface 21, the surface reflection is significantly reduced because the difference in the refractive index of water and glass is much smaller than the difference between air and glass. The polarization state is preserved in the reflection. In a flight situation, water cannot steadily adhere to the surface 21, so no stable reflection from water and air surface can be expected. So running in a continues mode, the detected light intensity in conductor 14 will drop from its previous high value under dry condition and the detected light intensity in conductor 16 will show a slight further decrease from its original low. Under ideal condition, the ratio of light intensity in conductor 14 over 16 remains the same. It would lower if there is un-corrected offset in the system.

When ice accretes on the surface 21, the surface reflection also reduces compared to the previous dry and clear condition. This is again due to the smaller refractive index difference between ice and glass versus air and glass. Light that enter the ice are scattered and the scattered light become de-polarized, i.e. their original polarization state is not preserved, so the scattered light energy is not only contained in the original state but also in the orthogonal state of polarization. Consequently, an increase in light intensity in conductor 16 will be detected, while a decrease in light intensity in conductor 14 occurs, wherein the reduced intensity is still higher than that in the case of a wet surface, and is no less than the light intensity received in conductor 16. The ratio of light intensity in conductor 14 over 16 is low.

If the surface is wet with de-icing fluid, the system response is similar to water on surface. The diluted de-icing fluid has an optical refractive index between that of water and glass, and is optically isotropic like water.

Figure 3B:
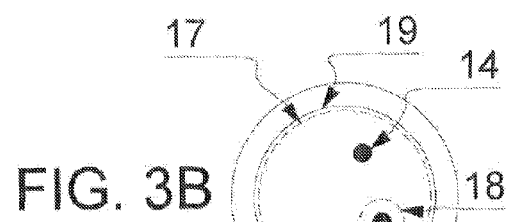
FIGS. 3A and 3B depict an alternate embodiment of the sensing head including alternate arrangements for the light source and polarizing filters.
Figure 3A:
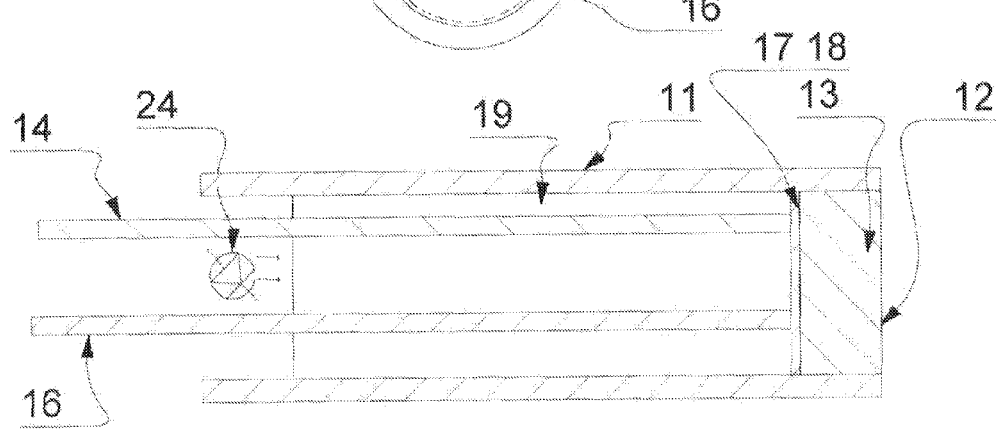

In accordance with a further aspect of the present invention, there is provided an alternate embodiment, as depicted in FIGS. 3A and 3B, where the remote light source and the light conductor 15 are replaced with a local light source 24 mounted inside the housing 11. The polarizing filter 18 covers only the end of the light conductor 16, and the polarizing filter 17 covers the rest of the area including the end of the light conductor 14.

Figure 4:
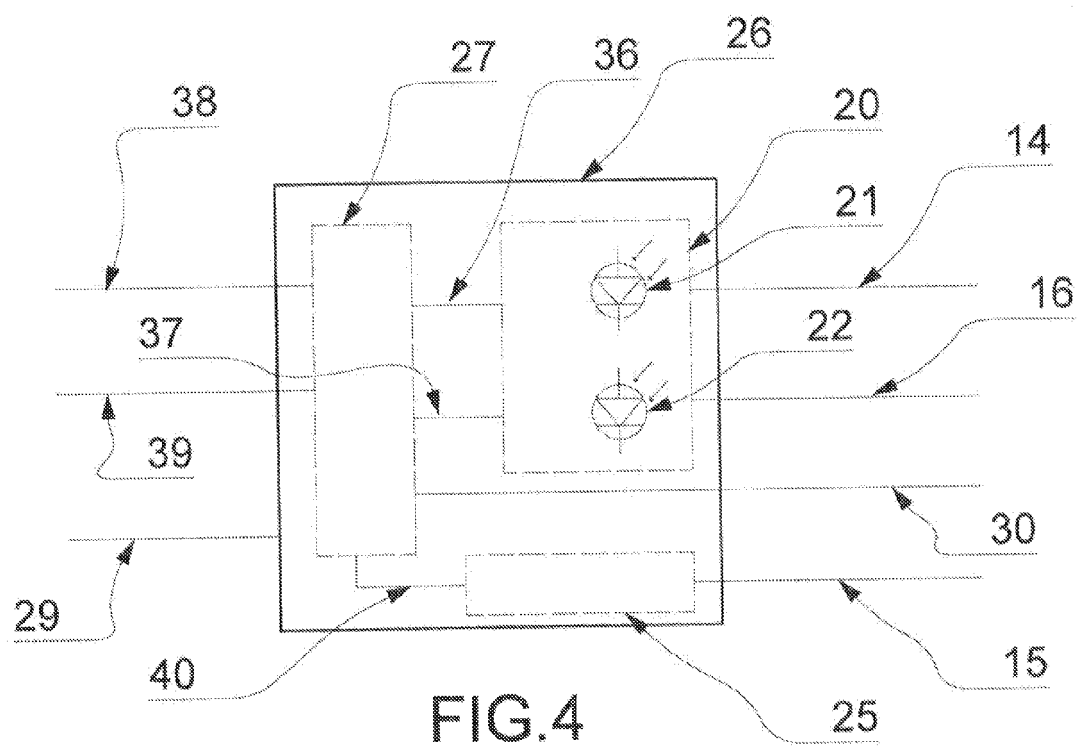
FIG. 4 is a schematic block diagram of the opto-electronic detection and electrical control module.

FIG. 4 shows a schematic block diagram of the Opto-electronic Detection and Electrical Control Module 26 in the preferred embodiment. All active components are contained in this module which is housed inside the aircraft. The module further contains a Light Source Module 25, Detector Module 20, and Processing and Control Module 27. The Light Source Module 25 generates the illuminating light which is transmitted to the ice collecting surface 12 via the light conductor 15. It is powered and controlled through link 40 by the Processing and Control Module 27. The reflected/scattered light of the original polarization state which is received by light conductor 14 is coupled to Photo Detector 21, and the light of the orthogonal polarization state to the original that is received in light conductor 16 is coupled to Photo Detector 22. The Detector Module 20 converts light intensities in the light conductors 14 and 16 into electrical signals proportional to the light intensities and may contain signal amplification if necessary. The photo detectors have wavelength dependent response and are not sensitive to ambient light. The Detector Module's outputs 36 and 37 are fed into the Processing and Control Module 27 for processing and decision making. The Processing and Control Module 27 monitors the Detector Module outputs 36 and 37, which represent the light intensities in conductor 14 and 16 respectively, and processes any change in their values and change in the ratio of the values to indicate ice accretion on the surface of the aircraft. When the ice collecting surface 21 is dry and clear, the output 36 is high while the output 37 is low and the ratio of 36/37 is very high. The actual ratio depends on components specifications and manufacturing tolerance, but a ratio of 5 or greater can be expected. When ice accretes on the surface 21, the output 36 drops to an intermediate level 1, and the output 37 increases to an intermediate level 2, and the ratio of 36/37 decreases markedly to a possible low of 1. After the ice accretion is detected, the Module 27 generates a warning signal 38 for the pilot alert system, and activates the heater 31 (FIG. 5) through link 30. The heating is maintained until changes in the ratio of outputs 36/37 indicate the removal of the accreted ice. After heating stops, ice may re-accrete on to the ice collecting surface if the icing condition persists. The Processing and Control Module 27 measures the time it takes for the ice re-accretion to appear, and generates a signal 39 indicating ice accretion severity accordingly. Alternatively, the Processing and Control Module 27 measures the time it takes to rid the surface 21 of ice, and generates a signal 39 indicating ice accretion severity accordingly. The entire Module 26 is powered by the aircraft power supply via link 29.

The operation of the Inflight Ice Detection System is continuous while the aircraft is inflight. Under continued icing condition, it will cycle through ice detection—heating—ice re-accretion and detection—heating steps.

Figure 5:
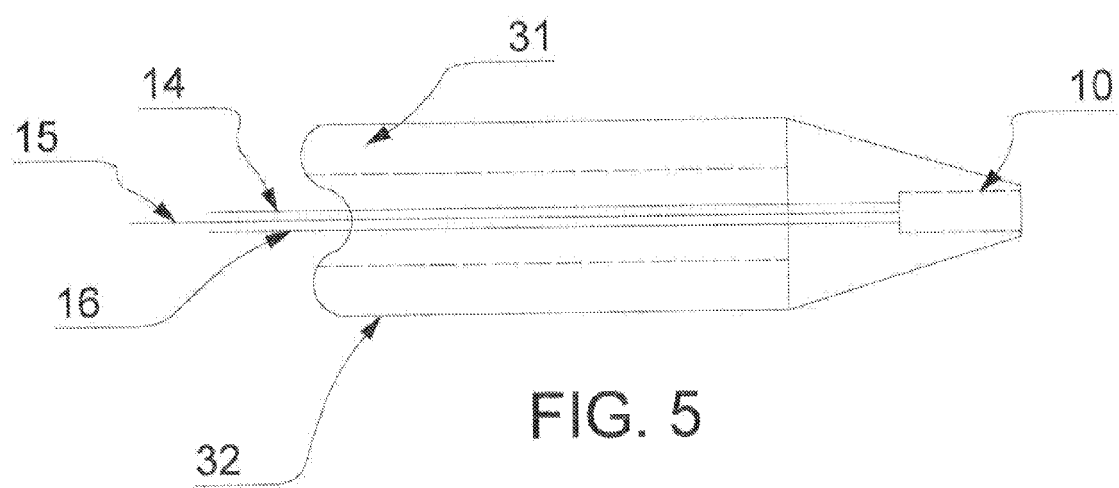
FIG. 5 depicts the preferred embodiment in which the sensing head is mounted in a heated sensor tube.

FIG. 5 depicts the preferred embodiment where the sensing head 10 is mounted inside a heated sensor tube 32, with heater 31. The sensor tube, exposed to the airflow inflight, may alternately be mounted to the fore of the aircraft or mounted via a strut under the wing. Such sensor tube is commonly used in the industry for air sensing applications and is commonly known to be components on which the accretion of ice first occurs on the aircraft, and its aerodynamic properties are proven.

Figure 6:
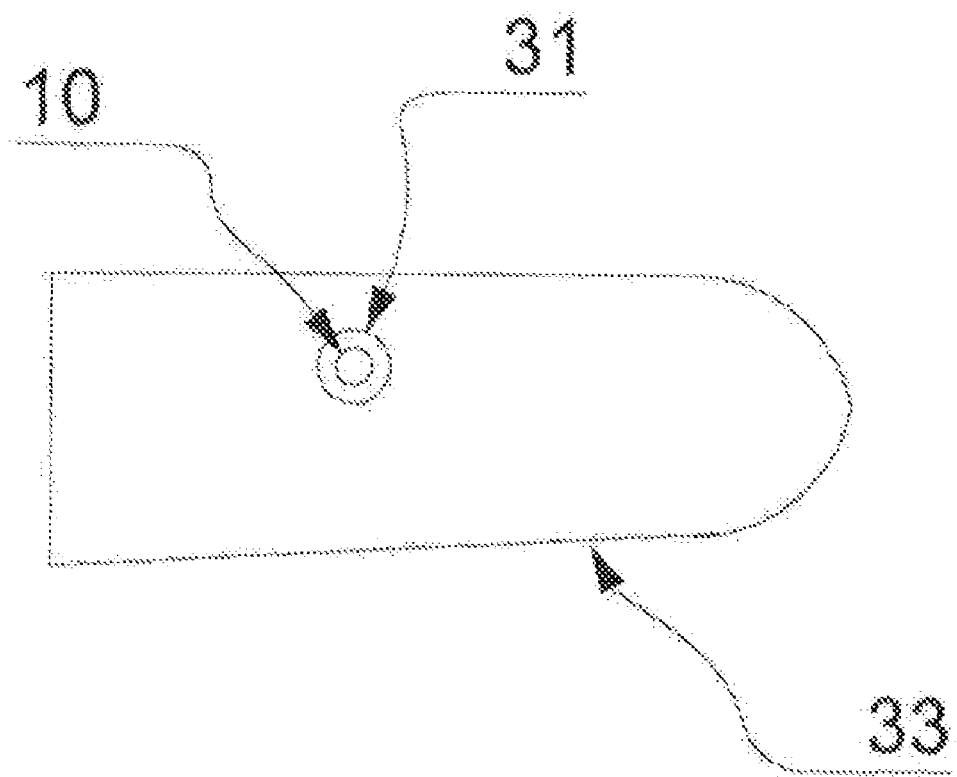
FIG. 6 depicts an embodiment in which the sensing head is mounted in a wing of the aircraft.

FIG. 6 depicts an alternate embodiment where the sensing head and an adjacent heating source is mounted in the wing surface 33, such that the ice collecting surface 21 is flush with the aircraft surface.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

We claim:

1. A dual channel method of detecting, inflight, accretion of ice on the surface of an aircraft, the method comprising:
    (a) Illuminating an ice collecting surface fixed in a housing mounted on an aircraft with a light source of single linear polarization;
    (b) Acquiring backscattered light from said ice collecting surface using a pair of polarization sensitive light conductors when the polarization sensitivity of the first receiving light conductor is aligned to the polarization of the light source and the polarization sensitivity of the second receiving light conductor is aligned orthogonal to the polarization of the light source;
    (c) Coupling each receiving light conductor to a light detector to determine the backscattered light intensity for each polarization state;
    (d) Processing the detected light intensities in each light detector to determine ratio between the light intensity for each polarization state;
    (e) Processing the change in said ratio to indicate ice accretion on the ice collecting surface;
    (f) Activating a heat source adjacent to said housing upon indication of ice accretion;
    (g) Continued operating of heat source until a change in detected light intensities indicates the removal of ice on the ice collecting surface;
    (h) Monitoring the detected light intensities in each light detector and processing the change in detected light intensities until re-accretion of ice is detected on the ice collecting surface;
    (i) Processing time for re-accretion of ice to indicate the ice accretion severity.

2. A method as claimed in claim 1 wherein said method is repeated continuously whilst the aircraft is inflight.

3. A method as claimed in claim 1 wherein said step (e) includes the step of: Activation of said aircraft inflight ice protection and pilot warning systems.

4. A method as claimed in claim 1 wherein said polarization sensitivity of said light source is determined by orientation of a polarizing filter placed at the end of a light conductor.

5. A method as claimed in claim 1 wherein said polarization sensitivity of receiving light conductors is determined by orientation of a polarizing filter placed on the end of each conductor.

6. A method as claimed in claim 1 wherein said ice collecting surface is an optically transparent material.

7. A dual channel method of detecting, inflight, accretion of ice on the surface of an aircraft, the method comprising:
    (a) Illuminating an ice collecting surface fixed in a housing mounted on an aircraft with a light source of single linear polarization;
    (b) Acquiring backscattered light from said ice collecting surface using a pair of polarization sensitive light conductors when the polarization sensitivity of the first receiving light conductor is aligned to the polarization of the light source and the polarization sensitivity of the second receiving light conductor is aligned orthogonal to the polarization of the light source;
    (c) Coupling each receiving light conductor to a light detector to determine the backscattered light intensity for each polarization state;

(d) Processing the detected light intensities in each light detector to determine ratio between the light intensity for each polarization state;

(e) Processing the change in said ratio to indicate ice accretion on the ice collecting surface;

(f) Activating a heat source adjacent to said housing upon indication of ice accretion;

(g) Continued operating of heat source until a change in detected light intensities indicates the removal of ice on the ice collecting surface;

(h) Monitoring the detected light intensities in each light detector and processing the change in detected light intensities until re-accretion of ice is detected on the ice collecting surface;

(i) Processing time for ice removal to indicate the ice accretion severity.

8. A method as claimed in claim 7 wherein said method is repeated continuously whilst the aircraft is inflight.

9. A method as claimed in claim 7 wherein said step (e) includes the step of: Activation of said aircraft inflight ice protection and pilot warning systems.

10. A method as claimed in claim 7 wherein said polarization sensitivity of said light source is determined by orientation of a polarizing filter placed at the end of a light conductor.

11. A method as claimed in claim 7 wherein said polarization sensitivity of receiving light conductors is determined by orientation of a polarizing filter placed on the end of each conductor.

12. A method as claimed in claim 7 wherein said ice collecting surface is an optically transparent material.

13. An inflight ice accretion detection system as claimed in claim 7 wherein said ice collecting surface is an optically transparent material.

14. An inflight ice accretion detection system as claimed in claim 7 wherein said housing is mounted in a sensing tube.

15. An inflight ice accretion detection system as claimed in claim 7 wherein said housing is mounted such that the ice collecting surface is flush to an aircraft surface.

16. An inflight ice accretion detection system as claimed in claim 7 wherein said light source transmission means incorporates an optical fiber.

17. An inflight ice accretion detection system as claimed in claim 7 wherein said receiving light conductors are optical fiber.

18. An inflight ice accretion detection system as claimed in claim 7 wherein polarization sensitivity is established using polarizing filters.

19. An inflight ice accretion detection system as claimed in claim 7 wherein said light detectors act as wavelength filters in being non-sensitive to ambient light.

20. A dual channel system to detect inflight ice accretion on the surface of an aircraft, said system comprising:

ice collecting surface fixed in a housing mounted on an aircraft;

transmission means to transmit a light source of single linear polarization to said ice collecting surface;

receiving means to acquire backscattered light from said ice collecting surface using one receiving light conductor with polarization sensitivity aligned to the polarization of the light source and a second receiving light conductor with polarization sensitivity aligned orthogonal to the polarization of the light source;

detection means to detect light intensities in each of said receiving light conductors;

processing means to determine the ratio of detected light intensities;

processing means to determine the change in the ratio as indication of ice accretion on said ice collecting surface;

a heat source adjacent to said housing that is initially activated upon indication of ice accretion and then maintained active until a change in detected light intensities indicates the removal of ice on the ice collecting surface; and control means to repeat process while inflight, determine ice accretion severity and activate the ice protection and pilot warning systems.

* * * * *